Oct. 6, 1931.  E. M. WALKER  1,826,486
JAR HOLDER
Filed Aug. 5, 1929
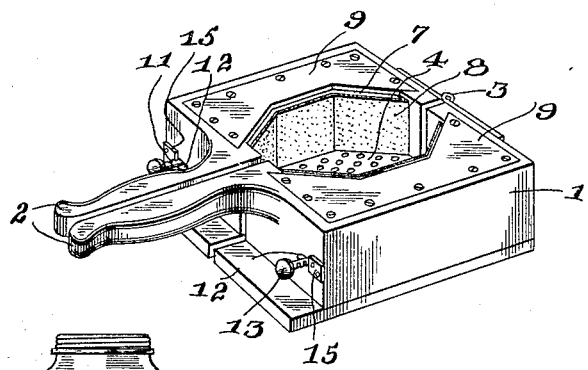
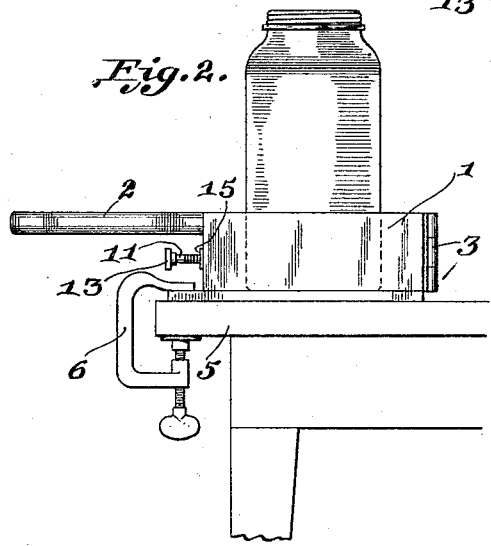
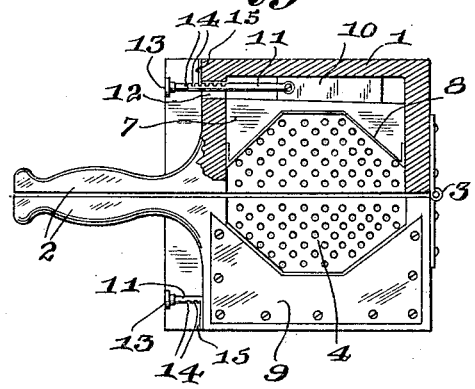
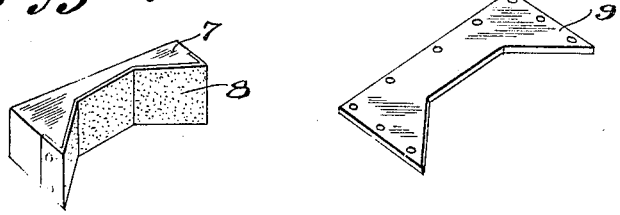
Inventor
Elsie M. Walker
By Donald L. Maxson.
Attorney Patented Oct. 6, 1931

1,826,486

UNITED STATES PATENT OFFICE

ELSIE M. WALKER, OF DEEP RIVER, IOWA

JAR HOLDER

Application filed August 5, 1929. Serial No. 383,533.

This invention relates to improvements in fruit jar holders, and more particularly to an implement which is provided with means for adjusting the jaws of the holder to the approximate size of the jar to be held, before the operating handles are taken hold of and compressed.

An object of the invention is to provide an improved fruit jar holder in which various sizes of jars may be positively and firmly held from rotation while the jar tops are being screwed on or being removed.

A further object of the invention is to provide an improved fruit jar holder which will be provided with clamping means to support the same on a table when desired, and a step by step adjustable cam for adjusting the jar holding jaws to the desired distance of separation.

A still further object of the invention is to provide an improved jar holder which will be provided with adjustable jar clamping or engaging jaws, and to provide the jaws with an interchangeable roughened material whereby the jaw will be prevented from slipping when the top is being placed thereon, or when the same is being removed.

Another object of the invention is to provide an improved fruit jar holder which will be highly efficient in use and which will be quite inexpensive to manufacture.

Other objects will appear as the description proceeds.

In the accompanying drawings which constitute a part of application,

Figure 1 is a perspective view of my improved jar holder;

Figure 2 is a side elevation thereof, showing the same supporting a jar and clamped to the edge of a table;

Figure 3 is a plan view of my jar holder, with a portion thereof being broken away and shown in section;

Figure 4 is a perspective view of one of the jar clamping jaws, and

Figure 5 is a perspective view of the cover plate for holding the jaw within the body of the holder.

Like characters of reference are used throughout the following specification and the accompanying drawings to designate corresponding parts.

In carrying out my invention, I provide a pair of similarly formed body members 1, provided with handles 2, and hinged together at 3. Each body member 1 has a perforated base 4, which extends out beyond the end of the said member on the side adjacent the handle 2, while one of the said outwardly extending projecting portions may be clamped to the edge of a table 5, by means of the clamp 6.

Concave jaw members 7 are slidably positioned within the body members 1, and are provided with facing strips 8 of sand paper, or any other desired material which will readily grip the sides of a wet or slippery jar. The facing strips 8 are removable and interchangeable, so that when one strip is worn, another may be substituted therefor. Cover plates 9 of approximately the same shape as the gripping jaws 7 are secured to the top surfaces of the body members, and serve to hold the jaws within the said body members.

It will be seen that the back surfaces of the jaw members 7 next to the side walls of the body members are angled or inclined and do not extend parallel with the said side walls of the body members. Angular cam adjusting blocks 10 are disposed in contact with the inclined surfaces of the jaw members and are positioned between the same and the adjacent side walls of the body members. The pivoted dogs 11 are pivotally connected to the adjusting blocks 10, and extend out through slots 12 in the end walls of the body members, and are formed with the grasping handles 13 on their free or outer ends. Each dog 11 is further provided with a plurality of slots 14, which may be selectively engaged by the teeth 15 carried by the ends of the body members.

From the foregoing description, it will be apparent that when it is desired to use the jar holder, it may be held in the hand or clamped to a table top as desirable. The jaw members are usually opened to their largest capacity, and the largest jars placed therein, after which the pivoted dogs 11 pivotally supported on the blocks 10 are swung on their pivots to disengage the teeth 15 from the slots 14 and the blocks are pushed inwardly to their proper adjustment, and the dogs 11 are again swung to their locked positions with the teeth 15 in engagement with the slots 14, and their tops placed thereon, or removed, and as the jars decrease in size and diameter, the cam blocks are pulled towards the handle ends of the body members, which action automatically forces the jaw members towards each other to more nearly approximate the size of the jars being held in the holder. Of course, the handles are compressed when the tops are being placed on the jars, or are being removed therefrom, to firmly grasp the same, and prevent rotation thereof.

It will be apparent that many minor changes in detail of construction may be resorted to without departure from the spirit of the invention.

Having thus described my invention what I claim as new and desire to secure by Letters Patent of the United States is:

1. A jar holder comprising a pair of hinged body members adapted to be positioned about the body of a jar, jar gripping jaws slidably mounted in said members, slip preventing material on the faces of said jaws, angular cam adjusting blocks for adjusting the distance between said jaws without moving said body members, and drain means in the bottom of said members.

2. A jar holder comprising a pair of hinged body members, jar gripping jaws slidably mounted in said members, angular cam adjusting blocks for adjusting the distance between said jaws, renewable slip preventing material on the faces of said jaws, drain means in the bottom of said body members, and handles formed on said members whereby the same may be compressed.

In testimony whereof I affix my signature.

ELSIE M. WALKER.